(12) United States Patent
Chen et al.

(10) Patent No.: US 10,067,383 B2
(45) Date of Patent: Sep. 4, 2018

(54) LIGHT SOURCE MODULE

(71) Applicant: AU Optronics Corporation, Hsin-Chu (TW)

(72) Inventors: Ming-Lung Chen, Hsin-Chu (TW); Chih-Ling Hsueh, Hsin-Chu (TW); Chi-Tang Ma, Hsin-Chu (TW); Chi-Wei Fan, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 31 days.

(21) Appl. No.: 15/237,890

(22) Filed: Aug. 16, 2016

(65) Prior Publication Data

US 2017/0168352 A1 Jun. 15, 2017

(30) Foreign Application Priority Data

Dec. 11, 2015 (TW) .............................. 104141650 A (51) Int. Cl.
*G09F 13/04* (2006.01)
*G02F 1/1335* (2006.01)

(52) U.S. Cl.
CPC .. *G02F 1/133608* (2013.01); *G02F 1/133603* (2013.01); *G02F 1/133605* (2013.01); *G02F 1/133606* (2013.01)

(58) Field of Classification Search
CPC ......... G02F 1/133608; G02F 1/133603; G02F 1/133605; G02F 1/133606
USPC ....................................... 362/97.1
See application file for complete search history.

(56) References Cited

U.S. PATENT DOCUMENTS

| 9,035,328 | B2 | 5/2015 | Lowes et al. | |
|---|---|---|---|---|
| 2012/0199852 | A1* | 8/2012 | Lowes | G09F 9/33 257/88 |
| 2014/0177221 | A1* | 6/2014 | Caldon | F21V 5/007 362/235 |

FOREIGN PATENT DOCUMENTS

| CN | 1213785 A | 4/1994 |
|---|---|---|
| CN | 101629697 A | 1/2010 |
| CN | 103104858 A | 5/2013 |
| CN | 103383084 A | 11/2013 |
| CN | 103562985 A | 2/2014 |

(Continued)

OTHER PUBLICATIONS

Taiwan Patent Office "Office Action" dated Jun. 27, 2016, Taiwan.

(Continued)

*Primary Examiner* — Anh Mai
*Assistant Examiner* — Meghan Ulanday
(74) *Attorney, Agent, or Firm* — WPAT, PC (57) ABSTRACT

A light source module including a substrate, a plurality of light source, and a first three-dimensional optical control structure is provided. The substrate includes a periphery region and a middle region. The plurality of light sources is disposed on the substrate. The first three-dimensional optical control structure is located in the periphery region of the substrate and located above the plurality of light sources. The first three-dimensional optical control structure covers one of the plurality of light sources. The light generated by the light sources passes through the first three-dimensional optical control structure and is emitted out. The first three-dimensional optical control structure has an asymmetrical shape.

18 Claims, 9 Drawing Sheets

(56) References Cited

FOREIGN PATENT DOCUMENTS

TW          M399955          3/2011

OTHER PUBLICATIONS

State Intellectual Property Office of the People's Republic of China, "Office Action", dated May 9, 2018.

* cited by examiner

LIGHT SOURCE MODULE

CROSS-REFERENCE TO RELATED APPLICATIONS

This application claims priority to Taiwan Patent Application No. 104141650 filed in the Taiwan Patent Office on Dec. 11, 2015, the entire content of which is incorporated herein by reference.

BACKGROUND OF THE INVENTION

The present disclosure relates to a light source module, and more particularly to a light source module having a three-dimensional optical control structure with an asymmetrical shape.

An LCD display usually comprises an LCD panel and a light source module which mainly functions to provide a surface light source required for the LCD panel to display. Generally, depending on the position of the light source, the light source modules can be divided into a direct type and an edge-lit type. The light source of a direct type light source module is disposed directly below the light source module, usually for an LCD display of large size, and the light source of an edge-lit type light source module is disposed at a side of the light source module, usually for an LCD display of small size.

In order prevent non-uniform brightness of the LCD display, a full optical film is generally used to homogenize and maintain the brightness of the entire display without compromising the light source brightness. However, for the prior art, the problem of non-uniform brightness distribution of optical films still exists, and an additional spacer is also required to provide sufficient support for the optical film. Thus, how to change the design of the optical film for achieving good brightness distribution while omitting the provision of the spacer is an issue to be addressed at present.

BRIEF SUMMARY OF THE INVENTION

The present disclosure provides a light source module that can achieve good brightness distribution without a spacer.

The light source module of the present disclosure comprises a substrate, a plurality of light sources, and a first three-dimensional optical control structure. The substrate comprises a periphery region and a middle region. The plurality of light sources is disposed above the substrate. The first three-dimensional optical control structure is located in the periphery region of the substrate and located above the plurality of light sources and covers one of the plurality of light sources. Light generated by the light sources passes through the first three-dimensional optical control structure to be emitted out. The first three-dimensional optical control structure has an asymmetrical shape.

Based on the forgoing, the light source module of the present disclosure comprises the first three-dimensional optical control structure in the periphery region of the substrate, and the first three-dimensional optical control structure has an asymmetrical shape. Further, a second three-dimensional optical control structure is located in the middle region of the substrate, and the second three-dimensional optical control structure has a symmetrical shape. Since the first three-dimensional optical control structure and the second three-dimensional optical control structure are three-dimensional structures, no spacer is required to provide the support for each three-dimensional optical control structure, thus omitting the provision of the spacer. In addition, the structure of the asymmetrical shape of the first three-dimensional optical control structure and the symmetrical shape of the second three-dimensional optical control structure can be used to solve the problem of non-uniform brightness distribution.

To make the above characteristics and advantages of the present invention clearer and easier to understand, the following embodiments are described in detail in conjunction with accompanying figures.

DETAILED DESCRIPTION OF THE INVENTION

Figure 1:
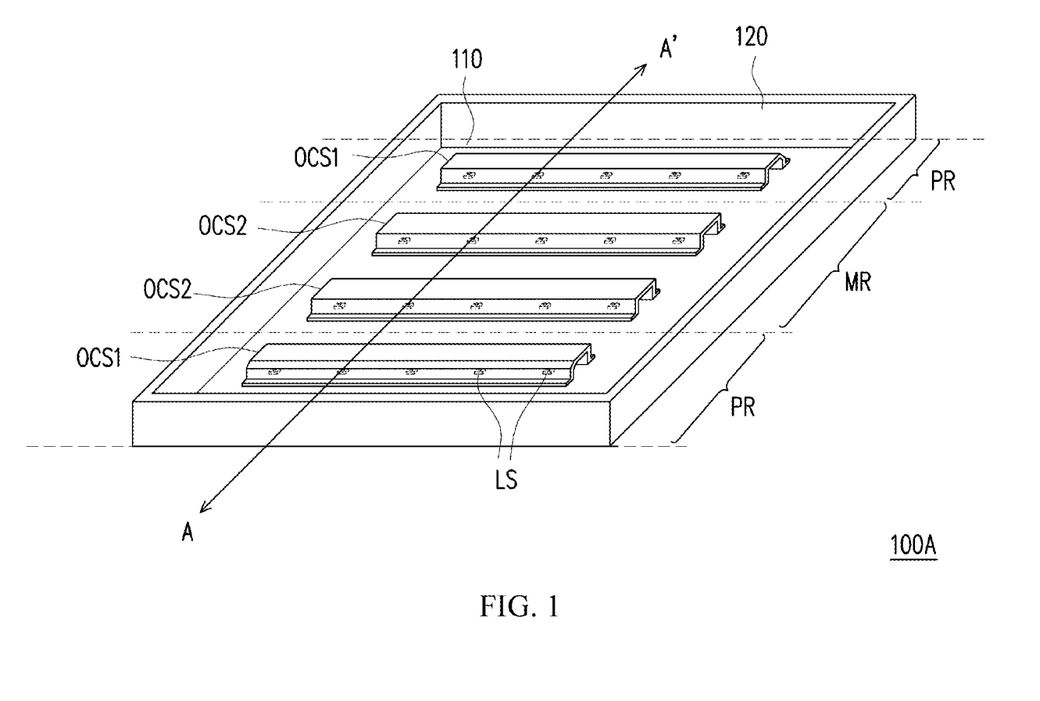
FIG. 1 is a schematic perspective view of a light source module according to an embodiment of the present disclosure.
Figure 2A:
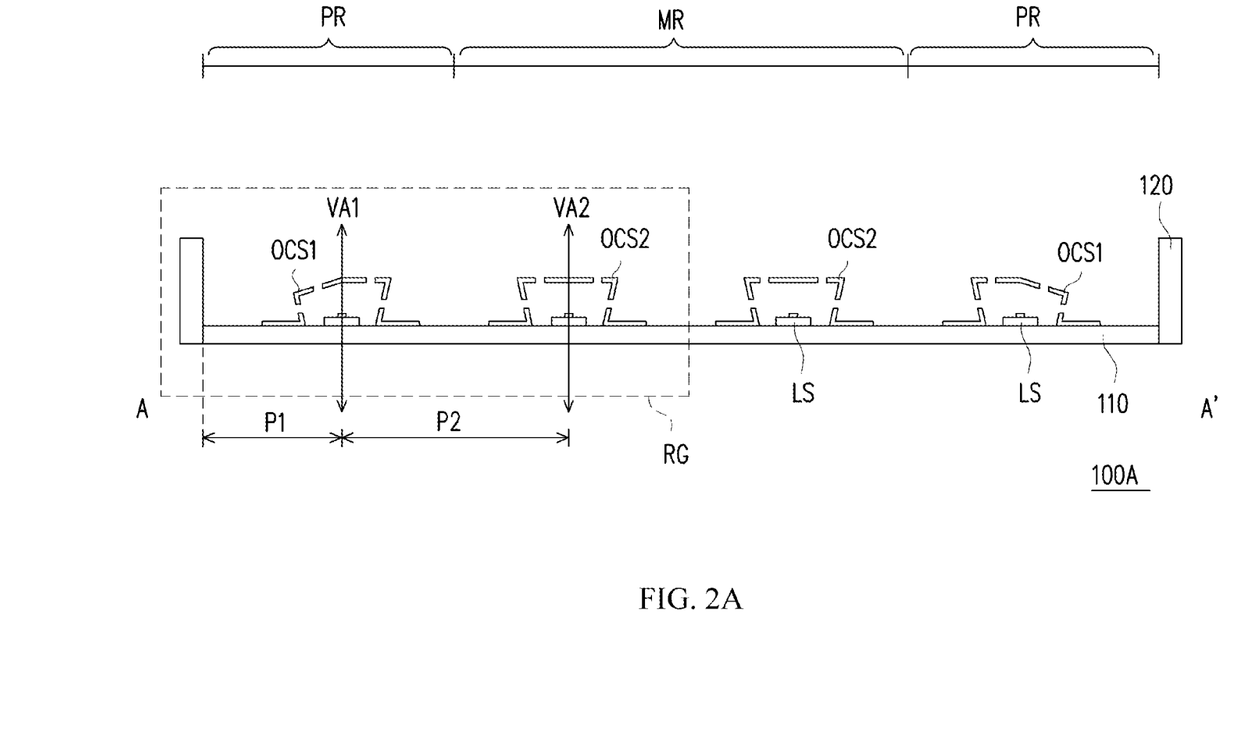
FIG. 2A is a cross-sectional schematic view taken along a line A-A' in FIG. 1.
Figure 2B:
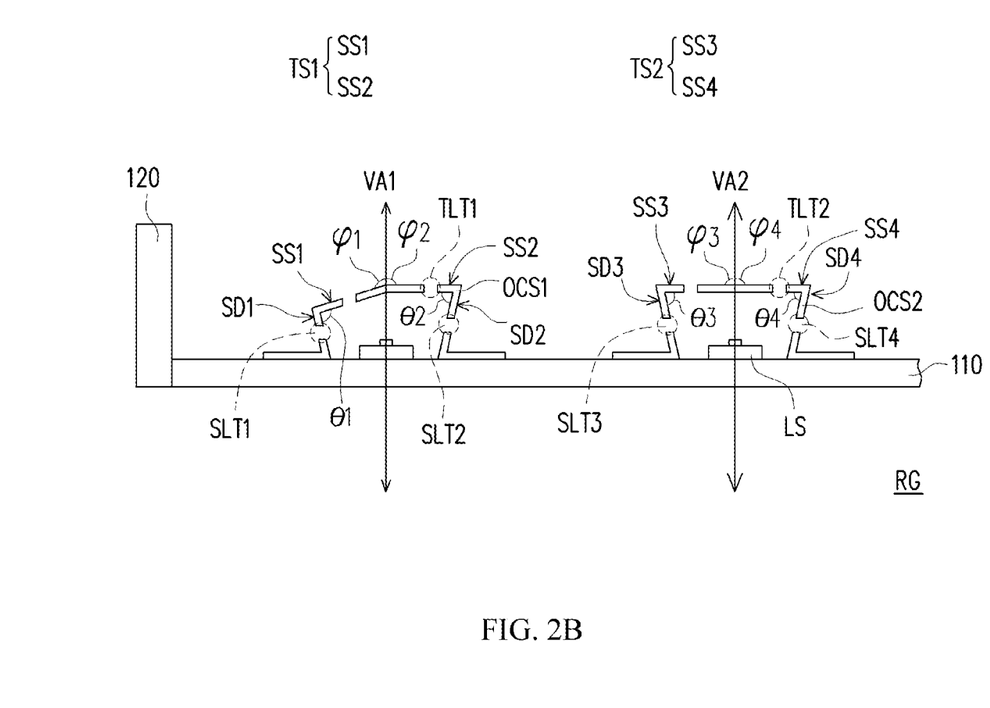
FIG. 2B is an enlarged schematic view of a region RG in FIG. 2A.

FIG. 1 is a schematic perspective view of a light source module according to an embodiment of the present disclosure. FIG. 2A is a cross-sectional schematic view taken along a line A-A' in FIG. 1. FIG. 2B is an enlarged schematic view of a region RG in FIG. 2A. Referring to FIG. 1, FIG. 2A, and FIG. 2B, a light source module 100A comprises a substrate 110, a plurality of light sources LS, a first three-dimensional optical control structure OCS1, a second three-dimensional optical control structure OCS2, and a frame 120. In particular, the substrate 110 comprises a periphery region PR and a middle region MR. The substrate 110 and the frame 120 are, for example, formed simultaneously and are of the same material. The frame 120 is disposed at a periphery of the substrate 110. The light sources LS are a plurality of strip-shaped light sources or formed by arranging a plurality of point light sources in a straight line, but are not limited thereto. In addition, the arrangement of the light sources LS on the substrate 110 may be changed according to the requirements. It is to be noted that, the light source module 100A of FIG. 1 is only shown with an arrangement of two first three-dimensional optical control structures OCS1, two second three-dimensional optical control structures OCS2, and the light sources LS. However, a person of ordinary skill in the art should understand that, in practice, the light source module 100A is formed by a plurality of first three-dimensional optical control structures OCS1, a plurality of second three-dimensional optical control structures OCS2, and the light sources LS.

In the present embodiment, the plurality of light sources LS is disposed above the substrate 110. The first three-dimensional optical control structure OCS1 is located in the periphery region PR of the substrate 110 and located above the light sources LS, and covers one of the plurality of light sources LS. Light generated by the light sources LS passes through the first three-dimensional optical control structure OCS1 to be emitted out. The first three-dimensional optical control structure OCS1 has an asymmetrical shape.

Referring to FIG. 2A and FIG. 2B, the first three-dimensional optical control structure OCS1 comprises a first top portion TS1, a first side portion SD1, and a second side portion SD2. The first side portion SD1 and the second side portion SD2 are connected to the first top portion TS1 respectively, to support the first top portion TS1. In the present embodiment, the first side portion SD1 and the first top portion TS1 of the first three-dimensional optical control structure OCS1 define a first interior angle $\theta 1$, and the second side portion SD2 and the first top portion TS1 define a second interior angle $\theta 2$, where $\theta 1 \neq \theta 2$. In particular, the first side portion SD1 is closer to an edge of the substrate 110 than the second side portion SD2, namely, disposed closer to the frame 120. In addition, the first interior angle $\theta 1$ and the second interior angle $\theta 2$ meet: $30° \leq \theta 2 < \theta 1 \leq 150°$.

In the present embodiment, the first three-dimensional optical control structure OCS1 has a first vertical axis VA1, and the first top portion TS1 comprises a first inclined surface SS1 and a second inclined surface SS2. The first inclined surface SS1 and the first vertical axis VA1 define a first surface angle $\phi 1$, and the second inclined surface SS2 and the first vertical axis VA1 define a second surface angle $\phi 2$, where $\phi 1 \neq \phi 2$. In addition, the first inclined surface SS1 is closer to the edge of the substrate 110 than the second inclined surface SS2, namely, disposed closer to the frame 120. In addition, the first surface angle $\phi 1$ and the second surface angle $\phi 2$ meet: $90° \leq \phi 2 < \phi 1 \leq 150°$.

The first three-dimensional optical control structure OCS1 has a first top light-transmission pattern TLT1. The size of the first top light-transmission pattern TLT1 at the first top portion TS1 gradually increases with the distance from the light sources LS. In other words, in FIG. 2A and FIG. 2B, if the light sources LS correspond to the middle of the first top portion TS1 as shown, the size of the first top light-transmission pattern TLT1 close to the light sources LS is small, but the present invention is not limited thereto. For example, in another embodiment, the light sources LS may be disposed not corresponding to the middle of the first top portion TS1. In addition, the first side portion SD1 of the first three-dimensional optical control structure OCS1 may further comprise a plurality of first side light-transmission patterns SLT1 such that the first side portion SD1 has a transmissivity A1, and the second side portion SD2 has a plurality of second side light-transmission patterns SLT2 such that the second side portion SD2 has a transmissivity A2, where A1≠A2.

In the present embodiment, the first side portion SD1 is closer to the edge of the substrate 110 than the second side portion SD2, and $0\% \leq A1 < A2 \leq 60\%$. In other words, the transmissivity of the first side portion SD1 is different from the transmissivity of the second side portion SD2. In addition, the first top light-transmission pattern TLT1, the first side light-transmission patterns SLT1, and the second side light-transmission patterns SLT2 are, for example, opening patterns, but are not limited thereto. In another embodiment, the first top light-transmission pattern TLT1, the first side light-transmission patterns SLT1, and the second side light-transmission patterns SLT2 may be, for example, light-transmitting material patterns, but are not limited thereto.

In the embodiment of FIG. 2A and FIG. 2B, the light source module 100A further comprises a second three-dimensional optical control structure OCS2 in the middle region MR of the substrate 110 and located above the light sources LS. The second three-dimensional optical control structure OCS2 covers one of the plurality of light sources LS. The light generated by the light sources LS passes through the second three-dimensional optical control structure OCS2 to be emitted out. The second three-dimensional optical control structure OCS2 has a symmetrical shape.

The second three-dimensional optical control structure OCS2 comprises a second top portion TS2, a third side portion SD3, and a fourth side portion SD4. The third side portion SD3 and the fourth side portion SD4 are connected to the second top portion TS2 respectively, to support the second top portion TS2. In the present embodiment, the third side portion SD3 and the second top portion TS1 of the second three-dimensional optical control structure OCS2 define a third interior angle $\theta 3$, and the fourth side portion SD4 and the second top portion TS2 define a fourth interior angle $\theta 4$, where $\theta 3 = \theta 4$.

In addition, the second three-dimensional optical control structure OCS2 has a second vertical axis VA2, and the second top portion TS2 comprises a third inclined surface SS3 and a fourth inclined surface SS4. The third inclined surface SS3 and the second central axis VA2 define a third surface angle $\phi 3$, and the fourth inclined surface SS4 and the second central axis VA2 define a fourth surface angle $\phi 4$, where $\phi 3 = \phi 4$. In addition, the third surface angle $\phi 3$ and the fourth surface angle $\phi 4$ meet: $90° \leq \phi 3 = \phi 4 = \phi 2 < \phi 1 \leq 150°$.

The second three-dimensional optical control structure OCS2 has a second top light-transmission pattern TLT2. The size of the second top light-transmission pattern TLT2 at the second top portion TS2 gradually increases with the distance from the light sources LS. In other words, in FIG. 2A and FIG. 2B, if the light sources LS correspond to the middle of the second top portion TS2 as shown, the size of the second top light-transmission pattern TLT2 close to the light sources LS is small, but the present invention is not limited thereto. For example, in another embodiment, the light sources LS may be disposed not corresponding to the middle of the second top portion TS2. In addition, the third side portion SD3 of the second three-dimensional optical control structure OCS2 has a plurality of third side light-transmission patterns SLT3 such that the third side portion SD3 has a transmissivity A3, and the fourth side portion SD4 has a plurality of fourth side light-transmission patterns SLT4 such that the fourth side portion SD4 has a transmissivity A4, where A3=A4. In other words, the transmissivity of the third side portion SD3 of the second three-dimensional optical control structure OCS2 is the same as the transmissivity of the fourth side portion SD4. In addition, the second top light-transmission pattern TLT2, the third side light-transmission patterns SLT3, and the fourth side light-transmission patterns SLT4 are, for example, open patterns, but are not limited thereto. In another embodiment, the second top light-transmission pattern TLT2, the third side light-transmission patterns SLT3, and the fourth side light-transmission patterns SLT4 may be, for example, light-transmitting material patterns, but are not limited thereto.

In addition, in the present embodiment, a distance between the first three-dimensional optical control structure OCS1 and the edge of the substrate 110 is P1, and a distance between the first three-dimensional optical control structure OCS1 and an adjacent second three-dimensional optical control structure OCS2 is P2, where P1<0.5×P2.

Based on this, the light source module 100A comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, when the first three-dimensional optical control structure OCS1 and the second three-dimensional optical control structure OCS2 meet the above conditions, the light source module 100A can achieve good brightness distribution while omitting the provision of the spacer.

Figure 3:
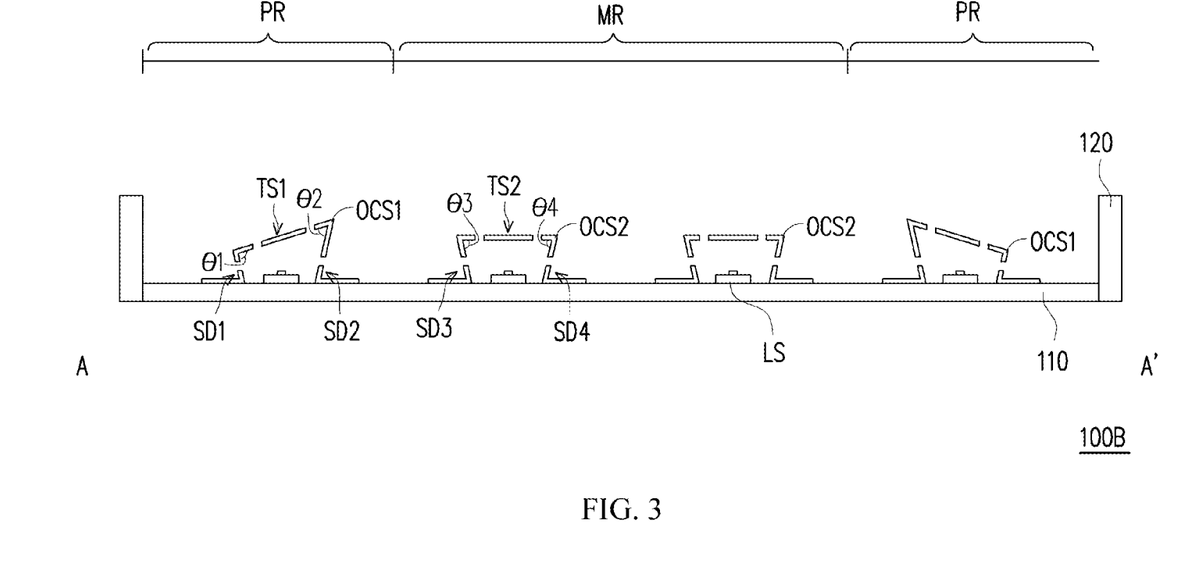
FIG. 3 is a cross-sectional schematic view of a light source module according to another embodiment of the present disclosure.

FIG. 3 is a cross-sectional schematic view of a light source module according to another embodiment of the present disclosure. A light source module 100B of this embodiment is similar to the light source module 100A of FIG. 2A and FIG. 2B, so identical elements are indicated by identical symbols and are not repeatedly described. The differences are further described below. As shown in FIG. 3, the first top portion TS1 of the first three-dimensional optical control structure OCS1 of the light source module 100B does not comprise the first inclined surface SS1 and the second inclined surface SS2. In particular, the first top portion TS1 does not comprise the first surface angle $\phi1$ and the second surface angle $\phi2$, and the first top portion TS1 is a single inclined surface. In the present embodiment, the first side portion SD1 and the first top portion TS1 of the first three-dimensional optical control structure OCS1 define a first interior angle $\theta1$, and the second side portion SD2 and the first top portion TS1 define a second interior angle $\theta2$, where $\theta1 \neq \theta2$. In additional embodiments, the first interior angle $\theta1$ and the second interior angle $\theta2$ may be further configured to meet: $30° \leq \theta2 < \theta1 \leq 150°$.

Similarly, the light source module 100B of FIG. 3 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100B can achieve good brightness distribution while omitting the provision of the spacer.

Figure 4:
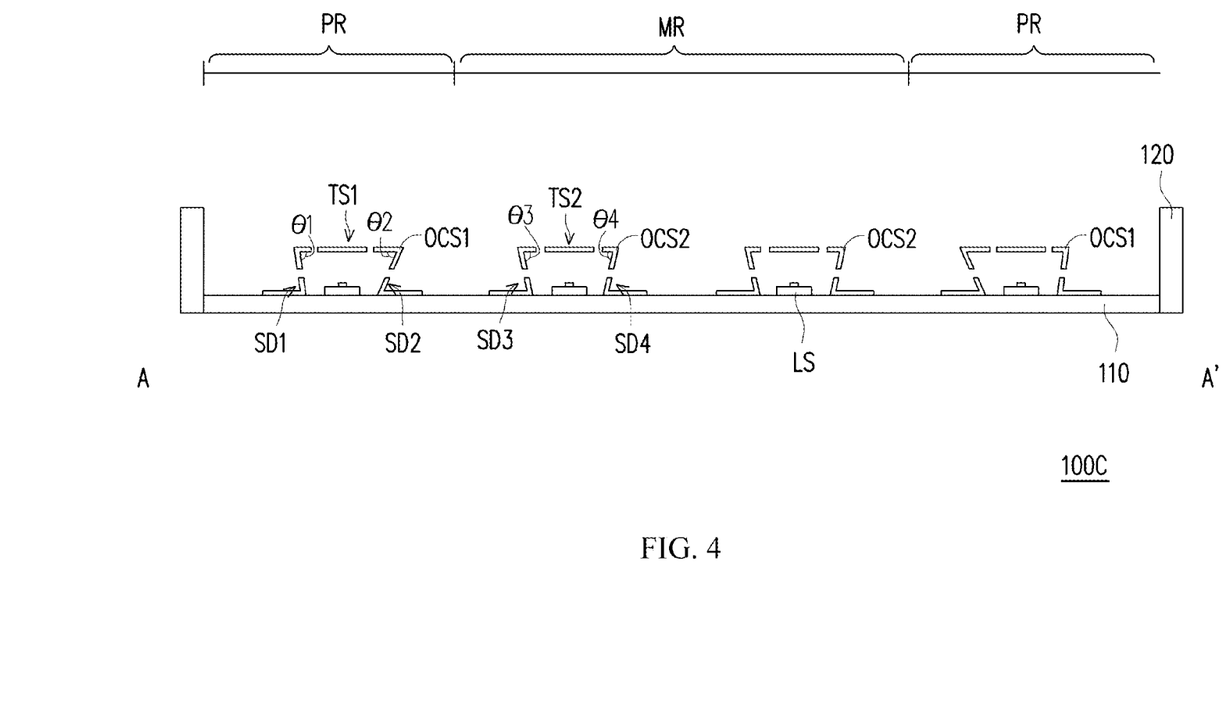
FIG. 4 is a cross-sectional schematic view of a light source module according to another embodiment of the present disclosure.

FIG. 4 is a cross-sectional schematic view of a light source module according to another embodiment of the present disclosure. A light source module 100C of this embodiment is similar to the light source module 100A of FIG. 2A and FIG. 2B, so identical elements are indicated by identical symbols and are not repeatedly described. The differences are further described below. As shown in FIG. 4, the first top portion TS1 of the first three-dimensional optical control structure OCS1 of the light source module 100C does not comprise the first inclined surface SS1 and the second inclined surface SS2. In particular, the first top portion TS1 does not comprise the first surface angle $\phi1$ and the second surface angle $\phi2$, and the first top portion TS1 has a horizontal plane. In the present embodiment, the first side portion SD1 and the first top portion TS1 of the first three-dimensional optical control structure OCS1 define a first interior angle $\theta1$, and the second side portion SD2 and the first top portion TS1 define a second interior angle $\theta2$, where $\theta1 \neq \theta2$. In additional embodiments, the first interior angle $\theta1$ and the second interior angle $\theta2$ may be further configured to meet: $30° \leq \theta2 < \theta1 \leq 150°$.

Similarly, the light source module 100C of FIG. 4 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100C can achieve good brightness distribution while omitting the provision of the spacer.

Figure 5:
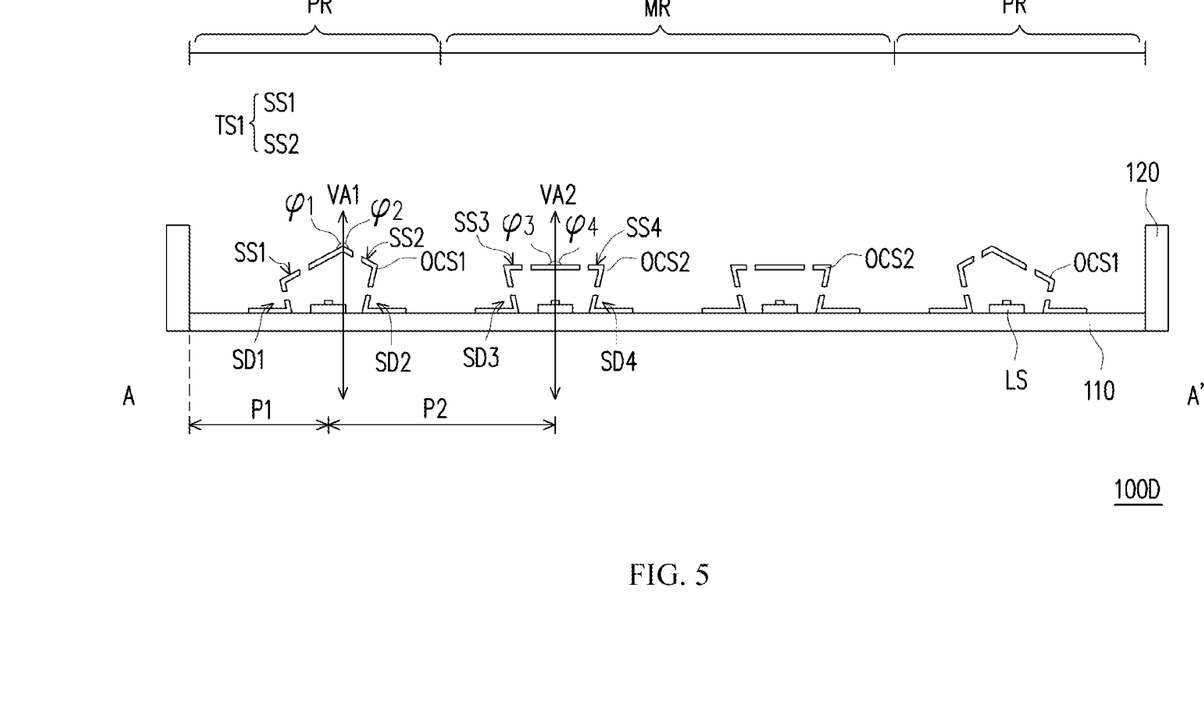
FIG. 5 is a cross-sectional schematic view of a light source module according to another embodiment of the present disclosure.

FIG. 5 is a cross-sectional schematic view of a light source module according to another embodiment of the present disclosure. A light source module 100D of this embodiment is similar to the light source module 100A of FIG. 2A and FIG. 2B, so identical elements are indicated by identical symbols and are not repeatedly described. The differences are further described below. As shown in FIG. 5, the first three-dimensional optical control structure OCS1 of the light source module 100D does not specifically define the first interior angle $\theta1$ and the second interior angle $\theta2$. In the present embodiment, the first three-dimensional optical control structure OCS1 has a first vertical axis VA1, and the first top portion TS1 comprises a first inclined surface SS1 and a second inclined surface SS2. The first inclined surface SS1 and the first vertical axis VA1 define a first surface angle $\phi1$, and the second inclined surface SS2 and the first vertical axis VA1 define a second surface angle $\phi2$, where $\phi1 \neq \phi2$. In additional embodiments, the first surface angle $\phi1$ and the second surface angle $\phi2$ may be further configured to meet: $90° \leq \phi2 < \phi1 \leq 150°$.

Similarly, the light source module 100D of FIG. 5 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100D can achieve good brightness distribution while omitting the provision of the spacer.

Figure 6:
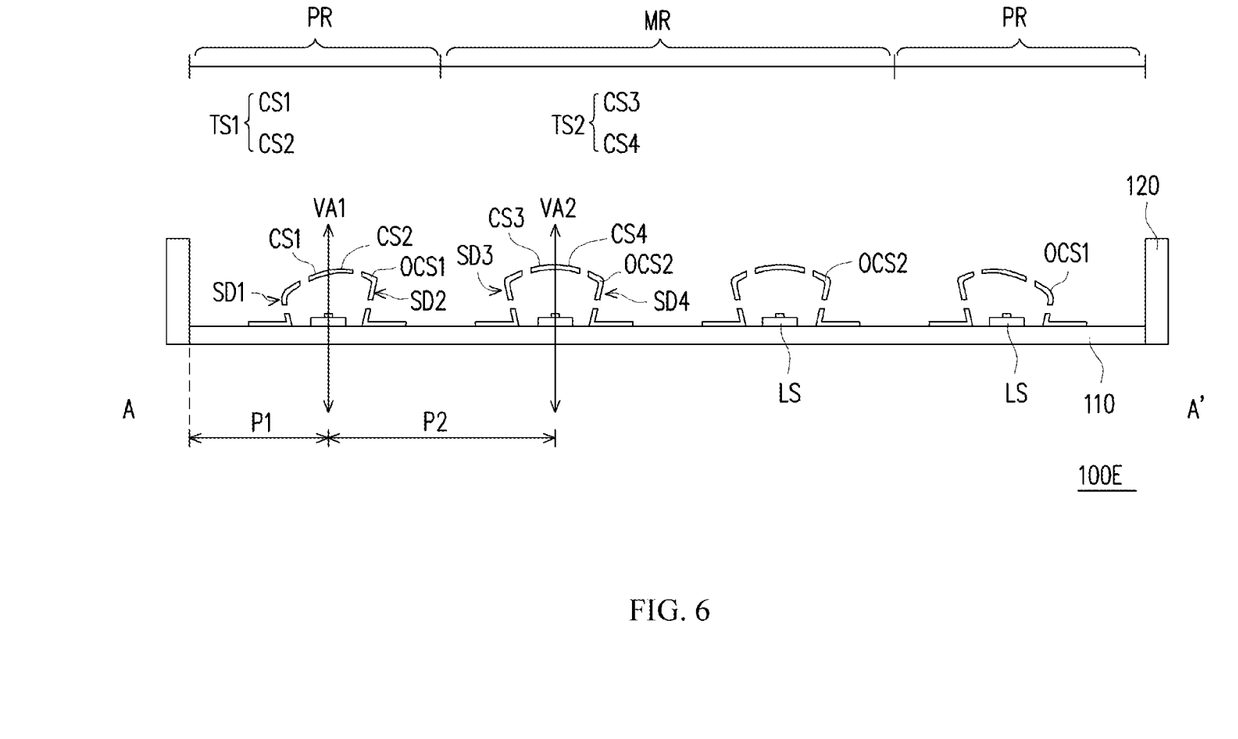
FIG. 6 is a cross-sectional schematic view of a light source module according to another embodiment of the present disclosure.

FIG. 6 is a cross-sectional schematic view of a light source module according to another embodiment of the present disclosure. A light source module 100E of this embodiment is similar to the light source module 100A of FIG. 2A and FIG. 2B, so identical elements are indicated by identical symbols and are not repeatedly described. The differences are further described below. As shown in FIG. 6, the first top portion TS1 of the first three-dimensional optical control structure OM of the light source module 100E comprises a first top curved surface CS1 and a second top curved surface CS2, and a curvature of the first top curved surface CS1 is different from a curvature of the second top curved surface CS2. In addition, in the present embodiment, a length of the second side portion SD2 of the first three-dimensional optical control structure OCS1 is greater than a length of the first side portion SD1. The second top portion TS2 of the second three-dimensional optical control structure OCS2 of the light source module 100E comprises a third top curved surface CS3 and a fourth top curved surface CS4, and a curvature of the third top curved surface CS3 is the same as a curvature of the fourth top curved surface CS4.

Similarly, the light source module 100E of FIG. 6 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100E can achieve good brightness distribution while omitting the provision of the spacer.

Figure 7:
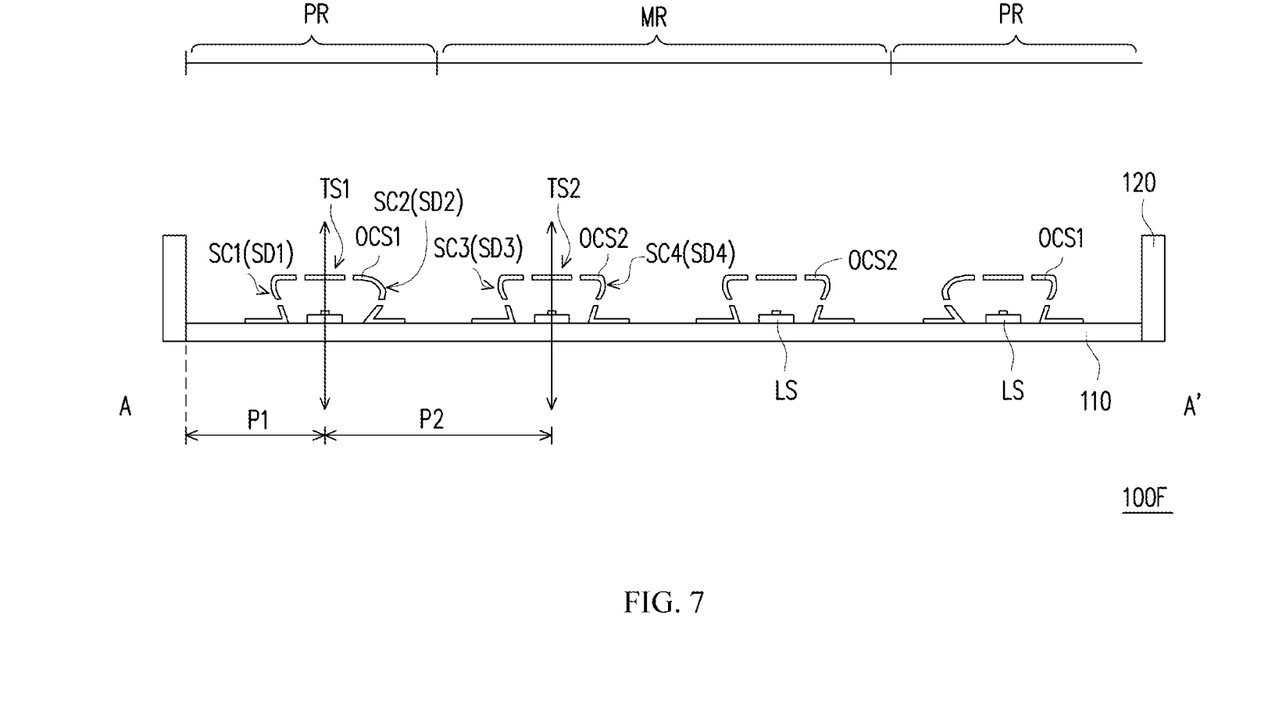
FIG. 7 is a cross-sectional schematic view of a light source module according to another embodiment of the present disclosure.

FIG. 7 is a cross-sectional schematic view of a light source module according to another embodiment of the present disclosure. A light source module 100F of this embodiment is similar to the light source module 100A of FIG. 2A and FIG. 2B, so identical elements are indicated by identical symbols and are not repeatedly described. The differences are further described below. As shown in FIG. 7, the first side portion SD1 of the first three-dimensional optical control structure OCS1 of the light source module 100F comprises a first side curved surface SC1, and the second side portion SD2 comprises a second side curved surface SC2, and a curvature of the first side curved surface is different from a curvature of the second side curved surface SC2. In the present embodiment, the first side curved surface SC1 is closer to the edge of the substrate 110 than the second side curved surface SC2, namely, disposed closer to the frame 120. In addition, a length of the second side curved surface SC2 is greater than a length of the first side curved surface SC1. The third side portion SD3 of the second three-dimensional optical control structure OCS2 of the light source module 100C comprises a third side curved surface SC3, and the fourth side portion SD4 comprises a fourth side curved surface SC4, and a curvature of the third side curved surface SC3 is the same as a curvature of the fourth side curved surface SC4.

Similarly, the light source module 100F of FIG. 7 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100F can achieve good brightness distribution while omitting the provision of the spacer.

Figure 8:
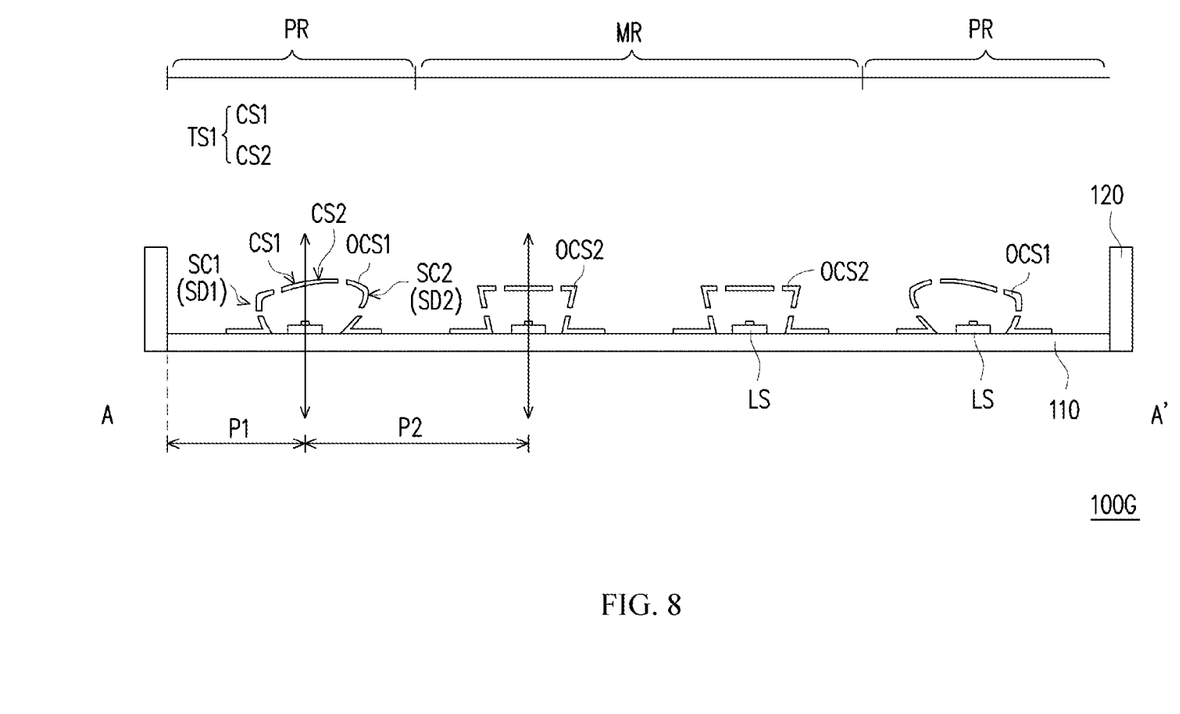
FIG. 8 is a cross-sectional schematic view of a light source module according to another embodiment of the present disclosure.

FIG. 8 is a cross-sectional schematic view of a light source module according to another embodiment of the present disclosure. A light source module 100G of this embodiment is similar to the light source module 100A of FIG. 2A and FIG. 2B, so identical elements are indicated by identical symbols and are not repeatedly described. The differences are further described below. As shown in FIG. 8, the first top portion TS1 of the first three-dimensional optical control structure OCS1 of the light source module 100G comprises a first top curved surface CS1 and a second top curved surface CS2, and a curvature of the first top curved surface CS1 is different from a curvature of the second top curved surface CS2. The first side portion SD1 of the first three-dimensional optical control structure OCS1 comprises a first side curved surface SC1, and the second side portion SD2 comprises a second side curved surface SC2, and a curvature of the first side curved surface is different from a curvature of the second side curved surface SC2. In the present embodiment, the first side curved surface SC1 is closer to the edge of the substrate 110 than the second side curved surface SC2, namely, disposed closer to the frame 120. In addition, a length of the second side curved surface SC2 is greater than a length of the first side curved surface SC1. The second three-dimensional optical control structure OCS2 of the light source module 100G is the same as the second three-dimensional optical control structure OCS2 of the light source module 100A of FIG. 2A and FIG. 2B.

Based on this, the light source module 100G of FIG. 8 comprises the first three-dimensional optical control structure OCS1 in the periphery region PR of the substrate 110, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Thus, the light source module 100G can achieve good brightness distribution while omitting the provision of the spacer.

It is to be noted that, the light source module of the present disclosure can select any combination of the first three-dimensional optical control structures OCS1 having an asymmetrical shape and the second three-dimensional optical control structures OCS2 having a symmetrical shape described in the embodiments in FIG. 2A, FIG. 2B to FIG. 8, and is not limited to the light source modules described in the embodiments above. Further, the optical control structures described herein may be internally reflective on their opaque portions to maximize light transmissivity through the corresponding light transmission patterns.

In sum, the light source module of the present disclosure comprises the first three-dimensional optical control structure OCS1 in the periphery region PR of the substrate, and the first three-dimensional optical control structure OCS1 has an asymmetrical shape. Further, the second three-dimensional optical control structure OCS2 is located in the middle region MR of the substrate 110, and the second three-dimensional optical control structure OCS2 has a symmetrical shape. Since the first three-dimensional optical control structure OCS1 and the second three-dimensional optical control structure OCS2 are three-dimensional structures, each three-dimensional optical control structure of the present disclosure has the supporting effect in itself, thus omitting the provision of the spacer. In addition, compared to the conventional full optical film, the three-dimensional optical control structures of the present disclosure has greatly reduced the area of the film, thus reducing the costs of related materials and assembling processes. Since the first three-dimensional optical control structure OCS1 has an asymmetrical shape and the second three-dimensional optical control structures OCS2 has a symmetrical shape, when the light generated by the light sources LS passes through the first three-dimensional optical control structure OCS1 or the second three-dimensional optical control structures OCS2 to be emitted out, the light source module can achieve good brightness distribution.

Even though the present invention has been disclosed as the abovementioned embodiments, it is not limited thereto. Any person of ordinary skill in the art may make some changes and adjustments without departing from the spirit and scope of the present invention. Therefore, the scope of the present invention is defined in view of the appended claims.

What is claimed is:

1. A light source module, comprising:
   a substrate, comprising a periphery region and a middle region;
   a first light source, disposed on the periphery region;

a first three-dimensional optical control structure, with an asymmetrical shape, disposed on the periphery region covering the first light source, comprising:
  a first top portion, comprising a first top light-transmission pattern;
  a first side portion; and
  a second side portion,
    wherein the first side portion and second side portion are connected to the first top portion respectively to support the first top portion separated from the substrate;
a second light source, disposed on the middle region; and
a second three-dimensional optical control structure, with a symmetrical shape, disposed on the middle region covering the second light source;
wherein light generated by the first light source passes through the first three-dimensional optical control structure, and light generated by the second light source passes through the second three-dimensional optical control structure; and
wherein the first three-dimensional optical control structure has a first vertical axis, the first top portion comprises a first inclined surface and a second inclined surface, the first inclined surface and the first vertical axis define a first surface angle $\varphi1$, and the second inclined surface and the first vertical axis define a second surface angle $\varphi2$, wherein $\varphi1 \neq \varphi2$.

2. The light source module of claim 1, wherein the first side portion and the first top portion define a first interior angle $\theta1$, and the second side portion and the first top portion define a second interior angle $\theta2$, wherein $\theta1 \neq \theta2$.

3. The light source module of claim 2, wherein the first side portion is closer to an edge of the substrate than the second side portion, and $30° \leq \theta2 < \theta1 \leq 150°$.

4. The light source module of claim 1, wherein the first inclined surface is closer to the edge of the substrate than the second inclined surface, and $90° \leq \varphi2 < \varphi1 \leq 150°$.

5. The light source module of claim 1, wherein the first top portion comprises:
  a first top curved surface, with a first curvature; and
  a second top curved surface, with a second curvature different from the first curvature.

6. The light source module of claim 1, wherein the first side portion comprises a first side curved surface with a first curvature, and the second side portion comprises a second side curved surface with a second curvature different from the first curvature.

7. The light source module of claim 6, wherein the first side curved surface is closer to the edge of the substrate than the second side curved surface, and a length of the second side curved surface is greater than a length of the first side curved surface.

8. The light source module of claim 1, wherein the first side portion of the first three-dimensional optical control structure has a plurality of first side light-transmission patterns such that the first side portion has a first transmissivity A1, and the second side portion has a plurality of second side light-transmission patterns such that the second side portion has a second transmissivity A2, wherein A1≠A2.

9. The light source module of claim 8, wherein the first side portion is closer to the edge of the substrate than the second side portion, and $0\% \leq A1 < A2 \leq 60\%$.

10. The light source module of claim 1, wherein the second three-dimensional optical control structure comprises:
  a second top portion;
  a third side portion; and
  a fourth side portion,
    wherein the third side portion and fourth side portion are connected to the second top portion respectively to support the second top portion separated from the substrate.

11. The light source module of claim 10, wherein the third side portion and the second top portion define a third interior angle $\theta3$, and the fourth side portion and the second top portion define a fourth interior angle $\theta4$, wherein $\theta3 = \theta4$.

12. The light source module of claim 10, wherein the second three-dimensional optical control structure has a second vertical axis, the second top portion comprises a third inclined surface and a fourth inclined surface, the third inclined surface and the second central axis define a third surface angle $\varphi3$, and the fourth inclined surface and the second central axis define a fourth surface angle $\varphi4$, wherein $\varphi3 = \varphi4$.

13. The light source module of claim 12, wherein $90° \leq \varphi3 = \varphi4 = \varphi2 < \varphi1 \leq 150°$.

14. The light source module of claim 10, wherein the second top portion comprises:
  a third top curved surface, with a third curvature; and
  a fourth top curved surface, with a fourth curvature equal to the third curvature.

15. The light source module of claim 10, wherein the third side portion comprises a third side curved surface with a third curvature, and the fourth side portion comprises a fourth side curved surface with a fourth curvature equal to the third side curvature.

16. The light source module of claim 10, wherein the third side portion has a plurality of third side light-transmission patterns such that the third side portion has a third transmissivity A3 and the fourth side portion has a plurality of fourth side light-transmission patterns such that the fourth side portion has a fourth transmissivity A4, wherein A3=A4.

17. The light source module of claim 1, wherein a distance between the first three-dimensional optical control structure and the edge of the substrate is P1, and a distance between the first three-dimensional optical control structure and an adjacent second three-dimensional optical control structure is P2, wherein P1<0.5<P2.

18. The light source module of claim 1, wherein said first three-dimensional optical control structure further comprises an opaque portion wherein the opaque portion reflects light generated by the first light source within the first three-dimensional optical control structure.

* * * * *